Feb. 21, 1967  H. E. G. ARNESON  3,305,282
HYDROSTATIC BEARING STRUCTURE
Filed March 29, 1966  4 Sheets-Sheet 1
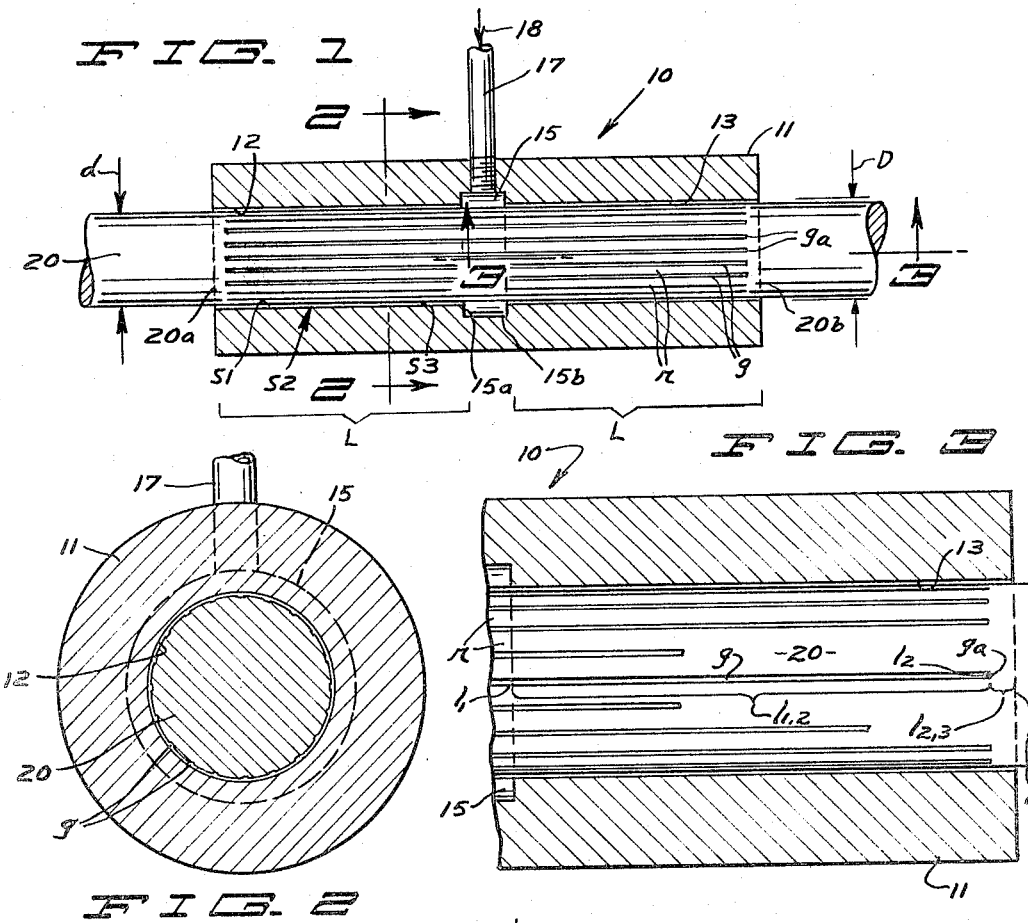
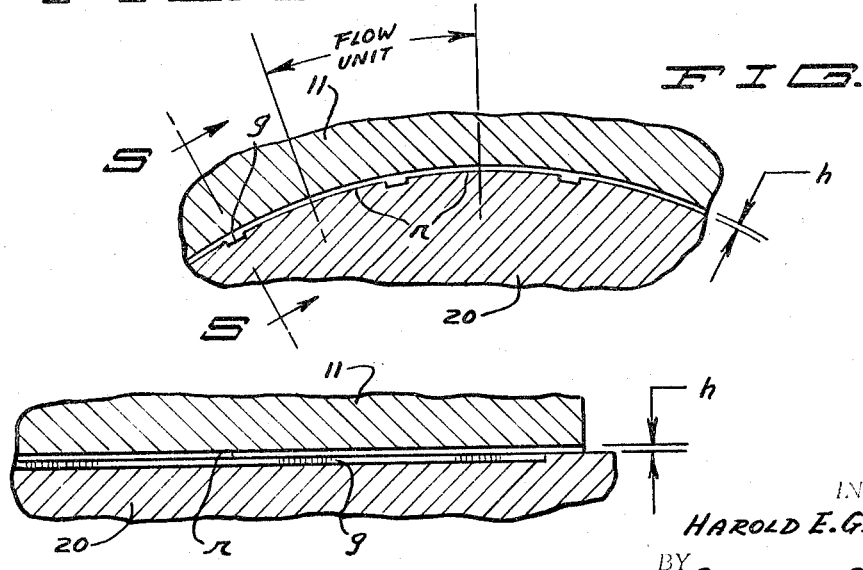
INVENTOR.
HAROLD E. G. ARNESON
BY Reyford Gregory
ATTORNEYS Feb. 21, 1967  H. E. G. ARNESON  3,305,282
HYDROSTATIC BEARING STRUCTURE
Filed March 29, 1966  4 Sheets-Sheet 2
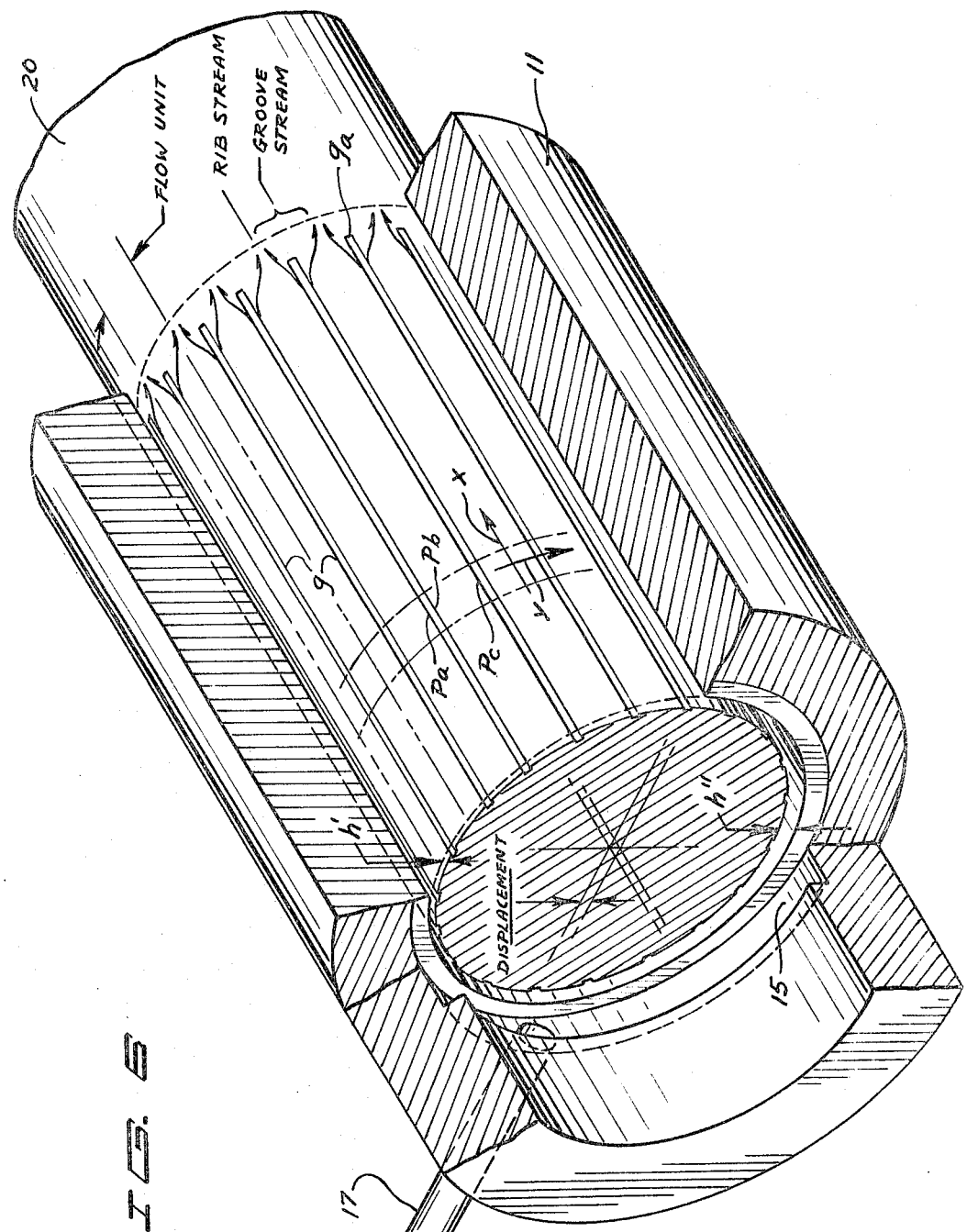
INVENTOR.
HAROLD E. G. ARNESON
BY
ATTORNEYS

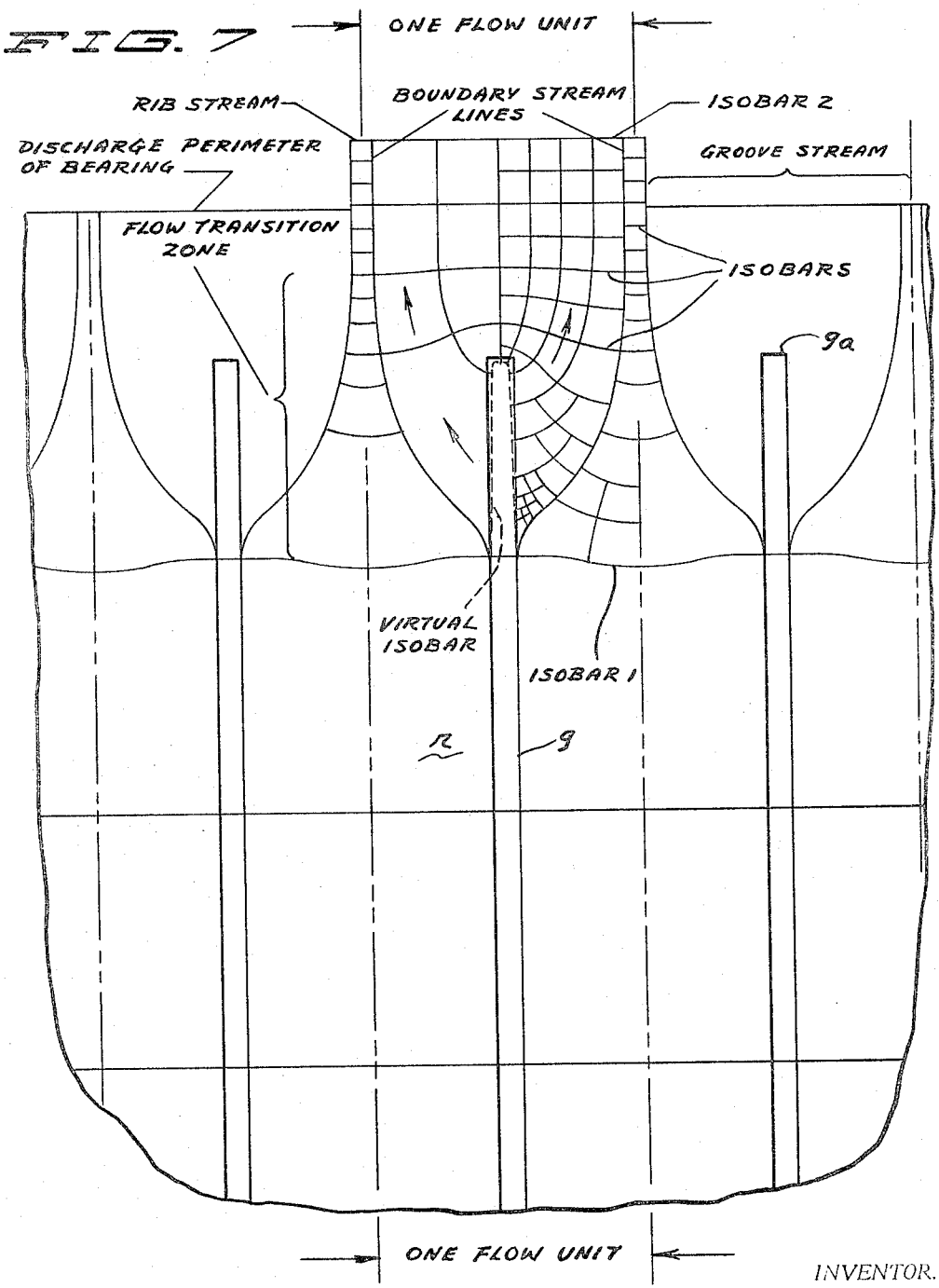

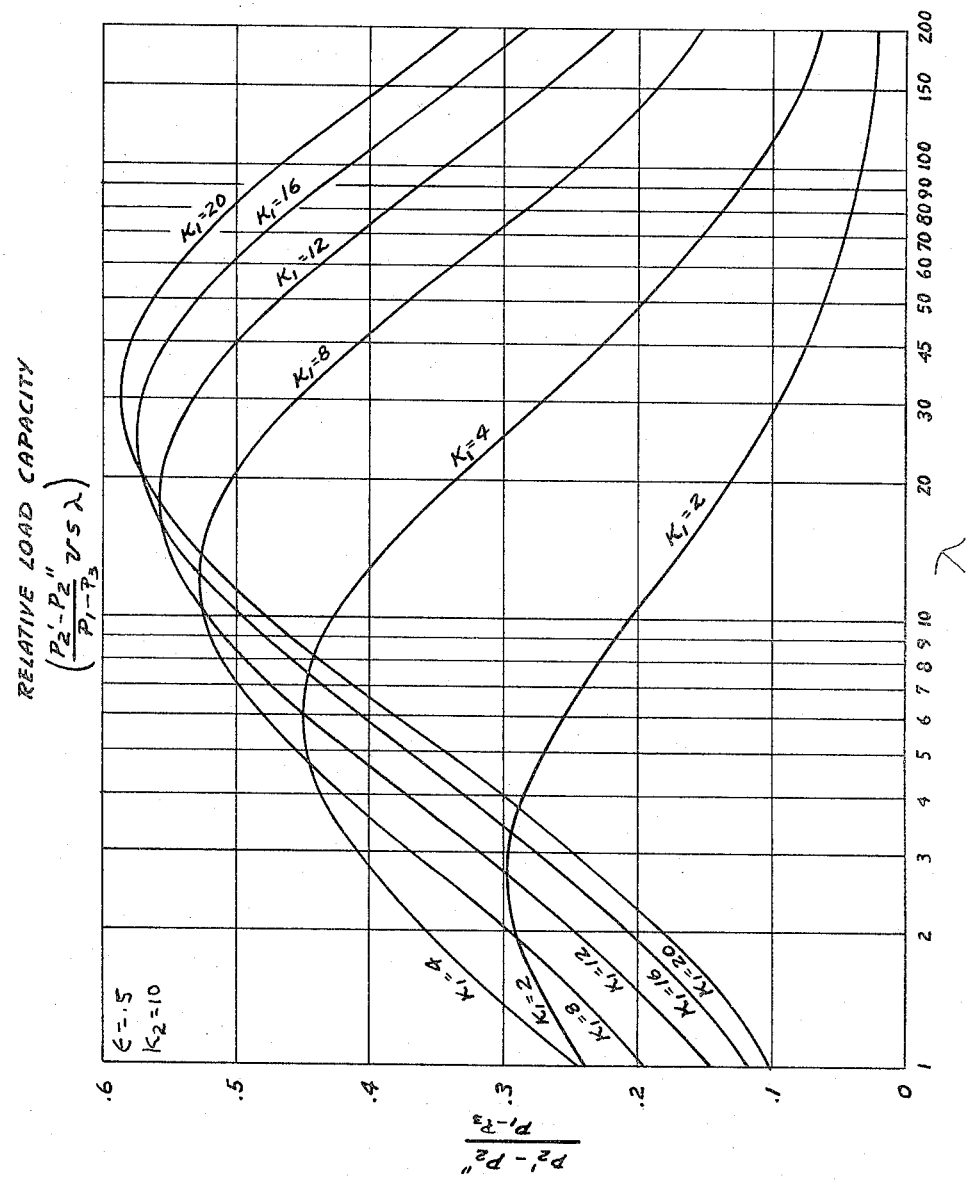

United States Patent Office 3,305,282
Patented Feb. 21, 1967

3,305,282
HYDROSTATIC BEARING STRUCTURE
Harold E. G. Arneson, 2861 E. Lake of the Isles Blvd.,
Minneapolis, Minn. 55405
Filed Mar. 29, 1966, Ser. No. 543,474
5 Claims. (Cl. 308—122)

This application is a continuation in part of my application S.N. 458,318, filed May 24, 1965, and S.N. 124,581, filed July 17, 1961, now abandoned.

This invention relates to an improvement in an externally pressurized or hydrostatic bearing structure, with specific reference being had to a grooved bearing structure.

As is known in the art, in an externally pressurized or hydrostatic bearing structure, under a condition of eccentricity, there is a tendency for lateral or cross flow of fluid through the bearing space which tends to equalize the pressure within this space. It is desirable to have a structure which under a condition of eccentricity tends to maintain a relatively high pressure in a region of relatively low clearance and a relatively low pressure in a region of relatively high clearance resulting in substantial net pressure difference. It is further desirable to have a structure which provides substantial improvement in improved load capacity, improved bearing stiffness, greater length to diameter ratio and relatively reduced energy requirements.

It will be understood that load capacity and bearing stiffness are derived from lateral pressure gradients within the bearing space. All fluid bearings have in common the requirement that lateral pressure gradients be maintained within a continuous space. Hydrostatic or externally pressurized bearings, in particular, have in common the above requirement and in addition the further requirement that energy for the maintenance of lateral pressure gradients be supplied by an external source and for this reason such bearings do not depend upon the relative motion of the bearing members to establish lateral pressure gradients as do the hydrodynamic types of bearings.

The improvement in the structure here presented comprises a partially grooved surface of precise proportions by means of which high lateral pressure gradients are obtained within the bearing space. The improvement in the restoring force of the bearing structure may be said to be due entirely to the higher lateral pressure gradients which are obtained as a result of a given displacement.

It is an object of this invention therefore to provide a hydrostatic bearing structure embodying a grooved structure particularly designed to deliver fluid to and to tend to confine fluid within regions of a higher pressure and to substantially restrict or reduce lateral or cross flow of said fluid into opposite regions of a lower pressure to obtain a greater net pressure difference than would otherwise be obtainable.

With reference to the previous object, the same is to be accomplished by restriction and minimumization of the loss of fluid by means of a greater flow resistance to lateral or cross flow of said fluid than to the longitudinal flow thereof.

It is a more specific object of this invention to provide a hydrostatic bearing structure comprising a pair of spaced surfaces having a first passage therebetween in which one of the surfaces has a plurality of longitudinally extending grooves and a second passage in which said surfaces are not grooved.

With reference to the object immediately above, said bearing structure is designed to have the flow resistance of said grooves so calibrated that the pressure drop along the length of the grooves falls within prescribed limits when the bearing is at its desired operating clearance, said limits being selected to provide the bearing structure with a higher load capacity than is obtainable with a corresponding bearing structure formed having opposed ungrooved surfaces.

It is another object of this invention to provide for an efficient bearing structure having a greater length to diameter ratio with a resulting larger load capacity than is obtainable with a corresponding bearing having opposed ungrooved surfaces.

It is an object of this invention to provide a bearing structure comprising ribs to provide relatively great lateral flow resistance and grooves particularly constructed to provide but relatively little lessened flow capacity to obtain increased pressures within themselves and within the adjacent rib area under an eccentric condition.

It is also an object of this invention to provide a design and arrangement of a grooved structure for use in connection with flat or cylindrical bearing surfaces and as well with spherical or conical bearing surfaces.

These and other objects and advantages of the invention will be set forth in the following description made in connection with the accompanying drawings in which like reference characters refer to similar parts throughout the several views and in which:

FIG. 1 is a view in longitudinal vertical cross section with portions thereof being broken away;

FIG. 2 is a view in vertical cross section on a somewhat enlarged scale taken on line 2—2 of FIG. 1 as illustrated;

FIG. 3 is a broken away portion of the view in FIG. 1 on an enlarged scale showing a typical detail thereof for purpose of illustration with other portions being faded out;

FIG. 4 is a broken view in cross section as if taken on FIG. 2 showing a detail thereof on an enlarged scale;

FIG. 5 is a view similar to FIG. 4 in longitudinal section taken on line 5—5 of FIG. 4;

FIG. 6 is a view in perspective on an enlarged scale with portions thereof being broken away and a portion for analysis being shown in dotted line;

FIG. 7 is a flux plot with respect to the device herein on an enlarged scale; and FIG. 8 is a chart showing relative load capacity.

With reference to the drawings and for the purpose of illustration, one embodiment of the bearing structure which is the subject matter of the invention herein is shown and is indicated generally by the reference character 10. It will be understood that the bearing structure disclosed may be utilized in various configurations and in many forms.

Said bearing 10 is shown formed comprising a cylindrical housing 11 having an unrestricted hydrostatic fluid supply chamber 15. Said supply chamber is here shown in the form of an annular chamber recessed within the surface of the bore of said housing 11 and having an unrestricted supply line 17 running to a suitable supply of fluid which for purposes of the present embodiment will be in the form of a liquid 18. The ends of said supply chamber are indicated by the characters 15a and 15b. Forming the inner surface portion of said housing and extending from either end of said supply chamber to the ends of said housing are bearings 12 and 13. Said bearings will be assumed to be of equal length. The length of each of said bearings is designated by the character L and the diameter of each by the character d.

Disposed through said housing and having portions journaled in said bearings is a shaft 20 having a diameter d of such length as to provide a small radial clearance h between it and the adjacent surfaces of said bearings 12 and 13. For purpose of reference, the bearing surfaces will be referred to as S1 and the shaft surface as S2, and the space between said surfaces about said shaft is the bearing space indicated by the character S3.

Said shaft is designed and constructed to have grooves $g$ spaced thereabout and extending longitudinally thereof over a portion of said shaft within said housing. Said grooves have shoulders $g^a$ at their respective ends. Said shoulders may take on various configurations. Formed between said grooves are ribs $r$.

At either end of said grooved portion of said shaft are ungrooved portions $20a$ and $20b$ thereof extending from the ends of said grooved portions to outer points representing the respective outer ends or the discharge perimeters of the bearings 12 and 13.

The bearing structure 10 has like functions in each of said bearings 12 and 13. Thus for the purpose of simplifying the description which is hereinafter given in greater detail, the bearing structure will be further described only with respect to said bearing 13 and the portion of the shaft $20b$ journaled therein.

Referring to FIG. 3, said grooved portions of said shaft extending from the end $15b$ of said supply chamber to the ends of said grooves $g$ will be referred to as first passage and will have points thereon adjacent said end $15b$ indicated by the characters $l_1$, and points thereon located at the ends of said groove $g$ will be indicated by character $l_2$. The respective lengths of said first passages will be indicated by the character $l_{1,2}$.

Said ungrooved portions $20a$ and $20b$ of said shaft within said bearings respectively form second passages as indicated between the characters $l_2$ and $l_3$. Thus the extent of each second passage will be indicated by the characters $l_{2,3}$.

With the clearance about the shaft 20 being indicated generally by $h$, the clearance at the ribs will be indicated by the character $h_r$ and the clearance at the grooves will be indicated by $h_g$. Groove clearance will extend from the bottom of a groove to the bearing surface thereabove.

The letter $b$ is used to indicate the width of a groove or rib in connection with the respective subscripts $g$ or $r$.

For purpose of reference and as indicated in FIGS. 4 and 6, a flow unit comprises the transverse space between the center lines of adjacent ribs with a groove therebetween extending the full length of the bearing 13 and comprising a first passage portion and a second passage portion. For purpose of explanation and with reference to FIG. 6, the fluid flowing through a channel defined by the walls of a groove extended to the bearing surface comprises a groove stream and the channel thus formed is referred to as a groove channel. In like manner the fluid flowing over a rib is referred to as a rib stream and is contained within a rib channel which is defined by the sides of a rib extended to the overlying bearing surface. The fluid flowing longitudinally of the shaft 20 will be regarded as longitudinal flow. Fluid flowing transversely of the shaft 20 will be regarded as lateral or cross flow. A lateral flow stream is indicated in FIG. 6 for purpose of analysis. Fluid flowing in the direction of the outer end of the bearing will be regarded as downstream flow.

From a point nearing the end of the first passage and extending over somewhat into the second passage is a zone or region referred to as a flow transition zone, as shown in FIG. 7. This is a region in which there are abrupt changes in longitudinal pressure gradients and this region will hereinafter be more specifically described.

For the purpose of describing more specifically the particular form of the embodiment of the bearing structure here presented, relative and numerical and derived values are provided. These have been determined by experiment and analysis.

The dimensions of the grooves, i.e., the length, width, height or clearance of the grooves and the lateral spacing of the grooves are proportioned with respect to the bearing space S3 of the bearing structure to provide a pressure drop along the grooves of 60% of the total pressure drop across the length of the bearing.

The structure herein will be assumed to have a clearance $h$ of .0005 inch, a groove length $l_{1,2}$ of 3.000 inches and the diameter $d$ of the shaft will be 1.750 inches. These dimensions have been selected to provide a relatively large length to diameter ratio of a bearing structure.

There will be twenty grooves about the shaft having a lateral spacing of .275 inch. The groove with $b_g$ will be .025 inch and from this it follows that the rib width $b_r$ is .250 inch.

Two dimensions remain to be determined. These dimensions are height or clearance of the grooves $h_g$ and the length of the second passage portion $l_{2,3}$. These can be found from the given dimensions as expressed in the following equations:

(Equation 1) $$\frac{K_1}{K_1+\lambda}=\frac{P_2-P_3}{P_1-P_3}$$

which in the instant case is .4.

P is the pressure at the respective points $l_{1,2,3}$ as indicated in FIG. 3.

$\lambda$ is the ratio of the length of the first and second passages.

$K_1$ is the ratio of flow capacity between the first and second passages.

(Equation 2) $$K_1=\frac{C_g+C_r}{C_s}$$

C is flow capacity and is indicated at the groove channels, the rib channels and by the subscript $s$ in the second passage.

(Equation 3) $$K_2=\frac{b_g}{b_r}$$

(Equation 4) $$\lambda=\frac{l_{1,2}-\Delta l}{l_{2,3}-\Delta l}$$

(Equation 5) $$\Delta l \cong .05\left[K_2\frac{K_1-1}{K_1}\right]^{1/3}b_r$$

$\Delta l$ is a correction factor which is applied to allow for the irregular pressure gradients within the flow transition zone.

(Equation 6) $$\tau=\frac{h_g}{h_r}$$

(Equation 7) $$K_3=\left(\frac{h_g}{h_r}\right)^3=\tau^3$$

(Equation 8) $$K_3=K_1K_2+K_1-K_2$$

which applies where $b_g \geq 5h_g$.

In order for Equations 1–7 to hold to provide a good working bearing, the following conditions should be present:

(1) $L>500h$
(2) $l_{2,3}>20h$
(3) $l_{2,3}>\frac{1}{4}b_r$

As will be described hereinafter, the parameters $K_1$ and $K_2$ should be made as great as possible in view of conditions (2) and (3) to obtain maximum load bearing characteristics.

Assuming $K_1=12$, then $\lambda=18$ from Equation 1 and $\Delta l=.026$ from Equation 5. Then from Equation 4, $l_{2,3}$ is found to be .139 inch which is more than $\frac{1}{4}b_r$, condition (3), and conditions (1) and (2) are also satisfied.

The parameter $K_2=\frac{.250 \text{ inch}}{.025 \text{ inch}}=10$.

From Equation 8, $K_3=12\times 10+12-10=122$.

From Equation 7, $\tau=(122)^{1/3}$ or $\frac{h_g}{h_r}=4.96$

From what is given above, $h=h_r=.005$ inch. The clearance or height of the groove $h_g$ is $4.96 \times .0005$ inch $= .00248$ inch and the groove depth from the plane of its upper surface is .00198 inch. Thus $h_g$ is less than $\frac{1}{3} b_g$ and Equation 8 is applicable. In instances where $h_g$ exceeds $\frac{1}{3} b_g$ or where the grooves are not rectangular in cross section, Equation 8 does not apply.

In summary, the dimensions above assumed or derived are as follows: Shaft diameter $d = 1.750$ inches, bearing diameter $D = 1.751$ inches, bearing length $L = 3.139$ inches, groove spacing $= .275$ inch, groove width $b_g = .025$ inch, groove clearance $h_g = .00248$ inch and length to diameter ratio $L/D = 1.79$.

No simple mathematical relationship exists relating the design parameters to load capacity. The specific load capacity of the bearing is defined as the maximum load that the bearing will support per square inch of projected area per pound per square inch of pressure drop across the bearing. In the instant case, the projected area of the bearing is $3.139 \times 1.75$ inches or 5.5 square inches. The specific load capacity decreases with increasing $L/D$ ratio and must be determined empirically. For a bearing structure of the proportions as above given, the specific load capacity is of the order of .22. This means if the outlet pressure is atmospheric or zero p.s.i. for a total pressure drop across the bearing of 100 p.s.i., the bearing will support a maximum of 5.5 square inches $\times 100$ lbs./in.$^2 \times .22 = 121$ lbs.

So far as is known by the inventor, this represents an improvement by a factor of 2 or 3 over bearings of this type.

*Operation*

With reference to the drawings, fluid at a pressure $P_1$ enters the bearing space S3 from the supply chamber 15 and flows downstream to be discharged at a pressure $P_3$. With the fluid here being considered as a liquid and hence incompressible, it will not alter the results obtained to consider the pressure $P_3$ at the point of discharge to be atmospheric pressure or zero p.s.i. Then $P_1 - P_3$, the pressure drop across the bearing, will be equal to $P_1$.

The conditions are made that the clearance $h$ shall be less than $\frac{1}{500}$ of the bearing length L and the length of the second passage $l_{2,3}$ shall be greater than twenty times the clearance $h$. These conditions are present in the values above given and these conditions assure that the viscous forces acting on the hydrostatic fluid shall be sufficiently large with respect to the so called "body forces" of inertia and gravity that the effects of these forces can be safely neglected for the purpose of analysis herein. These conditions are well known in defining properties of a thin fluid film such as in the instant case.

In view of the above conditions, the behavior of the fluid flow within the bearing space will be governed by the well known relationship which holds for thin films and may be stated as follows:

(Equation 9) $$Q = \frac{bh^3}{12\mu} \times \frac{\partial P}{\partial s}$$

(1) Q is the rate of flow of the stream in in.$^3$/sec.
(2) $b$ is the stream width in inches.
(3) $h$ is the height of the clearance in inches.
(4) $\mu$ is the absolute viscosity.
(5) $\partial P/\partial s$ is the rate of change of pressure with respect to distance measured along the stream line of the fluid in lbs./in.$^2$/inches.

For purposes herein, flow capacity of a channel of the bearing space is defined as the rate of flow past a given point of cross section of a channel for a given pressure gradient at such point and for a given viscosity of the fluid, i.e., (Equation 10) $$C = \frac{Q}{\frac{\partial P}{\partial s}} \times \mu$$

where C is the flow capacity in $$\frac{\frac{\text{in.}^3}{\text{sec.}}}{\frac{\text{lb./in.}^2}{\text{in.}}} \times \mu$$

Subscripts are used to denote a particular channel, thus:
(1) $C_g$ will indicate the flow capacity of a groove channel;
(2) $C_r$ will indicate the flow capacity of a rib channel; and
(3) $C_s$ will indicate the flow capacity of the second passage portion of a flow unit.

The flow resistance of a channel is indicated by the character R and is defined as being the reciprocal of the flow capacity of the channel, that is, $$Rg = \frac{1}{Cg}$$

It will be assumed that the shaft is radially centered within the bore of the bearing and that a steady state of fluid flow has been established. With the shaft centered, the flow will be identical in each of the twenty flow units within the bearing space. With reference of FIGS. 4, 6 and 7, considering the flow unit indicated as typical, fluid will enter to groove channel and rib channel portions therein. It can be shown by analysis and has been demonstrated by experiment that the fluid entering a groove channel and the fluid entering the adjacent rib channel portions will proceed downstream as distinctly separate streams having no appreciable interchange of fluid until the zone of flow transition is reached near the end of the groove. The pressure gradient of the groove stream between the beginning of the groove and the beginning of the zone of flow transition will be uniform and will depend only upon the flow resistance of the groove channel and the rate of flow of the stream. The same will be true of the flow of the streams in the adjacent rib channel portions. The gradients of said adjacent streams are identical until a point is reached at the beginning of the zone of flow transition and here the gradient of the groover stream begins to diminish. The pressure of the groove stream at this point begins to exceed that of said adjacent rib streams causing fluid to be forced outwardly laterally from the groove stream into said adjacent rib channel portions of the flow unit. This same action occurs in adjacent of flow units with the effect that each of the rib streams within the bearing space is squeezed from both sides and the fluid of each of said streams must flow within a narrower space. The added fluid flowing in the rib channel portions causes an increase in the rate of pressure drop of the merging streams now flowing in the rib channel portions and the gradient of the groove streams decreases further because of the reduced flow in the groove channels with a resulting greater excess pressure of the groove stream. This condition continues until at the end of the groove, the portion of the groove flow remaining within the confines of the groove channel flows directly over the shoulder at the end of the groove into the second passage portion of the flow unit. The last mentioned flow of fluid from the end of the groove enters the more shallow channel space of the second passage with an excess of pressure over that of the transversely adjoining fluid of the merged streams. The pressure within the stream measured along a transverse cross section of the stream at the end of the groove will be greatest at the center of the groove channels and will be least at the center of the rib channels. These local lateral pressure gradients exist throughout the transition zone due to the back pressure resulting from the impediment formed by the shoulder at the end of the groove channel and are accompanied by corresponding variations of velocity of the stream portions remaining within the groove channel as well as in the stream portions flowing within the rib channel. These local lateral pressure gradients persist for a short distance into the second passage where they are quickly attenuated by the viscous force acting across the streams and longitudinal flow is re-established. The point where the longitudinal flow is re-established marks the end of the zone of flow transition. From this point to the end of the bearing, an increased uniform longitudinal gradient is established which in the present embodiment is twelve times as great as the longitudinal gradients of the first passage.

Within the zone of flow transition, the groove stream diverges and the rib stream is constricted by an amount which depends upon the relationship of the flow capacity of the rib channel relative to that of the groove channel. In the present embodiment, the width of the rib stream in the second passage is constricted to precisely $\frac{1}{12}$ of the width of the rib channel. Since the clearance space of the rib stream does not change, the pressure gradient following the transition zone will be twelve times that of the pressure gradient preceding the transition zone. The diverged groove stream will occupy the balance of the space of the second passage portion of the adjacent rib streams and will have a lateral extent equal to the width of the groove plus $\frac{11}{12}$ of the widths of the adjacent rib portions with the result that its gradient is equal to that of the constricted rib stream.

The ratio of the gradients prior to and subsequent to the transition zone is determined by the cross section dimensions and spacing of the grooves relative to the bearing clearance.

The combined streams are discharged from the bearing at pressure $P_3$ or atmospheric pressure.

Referring to FIG. 7, a flux plot is shown indicating a portion of a flow unit with particular emphasis on the zone of flow transition. The diagram is constructed in the usual manner for flow between closely spaced parallel plates where the stream lines are everywhere perpendicular to the lines of equal pressure, and the spacing between stream lines is proportional to the spacing between the lines of equal pressure in conformance with the fact that the quantity of fluid flowing between a pair of stream lines is directly proportional to the width of the stream and to the pressure gradient along the stream. The lateral lines of equal pressure are referred to as isobars. Said isobars represent equal increments of pressure and the spacing of the stream lines is chosen to form curvilinear squares therewith. One square of a groove stream will be exactly equal to a dozen squares of the adjacent rib stream.

The isobar 1 represents the fluid pressure of both the rib channel and groove channel at the point of the beginning of the flow transition zone.

There is substantial resistance to flow along the groove of the flow unit shown and for this reason its perimeter cannot be considered to be an isobar as would be possible in the case of flux plots for ordinary pressure fed bearings which are regarded as having no pressure drop along their grooves. Hence by dotted line a virtual isobar is shown to compensate for the lower resistance of the groove channel. A stream line flowing in the groove channel from a point on isobar 1 will undergo a certain pressure drop. The virtual isobar is constructed such that said stream line would undergo the same pressure drop in the length between the virtual isobar and the perimeter of the groove had it been subject to the flow resistance of the rib channel.

One flux square of the groove stream is defined by the virtual isobar and isobar 2 at its ends and the boundary lines between the groove stream and adjacent rib streams at its sides. Stream lines form the boundary lines between the groove stream and the adjacent rib streams. For clarity of presentation, the parameter $K_1 = 11.85$ instead of 12 has been adopted for the flux plot here shown in order that the width of the rib streams downstream of the transition zone will be precisely $\frac{1}{12}$ of the width of the groove stream. Consequently the isobars represented by squares of the rib streams must represent precisely $\frac{1}{12}$ of the pressure difference represented by the isobars of the corresponding groove squares. In like manner squares formed by subdivisions of the streams must retain this basic relationship.

In the diagram, the right hand half of the flux square has been divided into four substreams, each representing $\frac{1}{8}$ of the total groove stream flow and the isobars forming flux squares with these sub-streams each represent $\frac{1}{8}$ of the pressure drop from isobar 1 to isobar 2.

The diagram represents actual conditions of flow both with gas and liquid with respect to the invention herein. Although expansion of gas in the course of its flow must be taken into account in principle it can be disregarded here as the effect with regard to the invention herein is small because the pressure drop through the transition zone is small and the expansion therefore is slight.

As indicated in FIG. 7, the pressure gradient prior to the transition zone is uniform and the pressure laterally is the same for a groove channel as for a rib channel. It is seen that the pressure of the rib channel is greater than it otherwise would be due to the divergence of the groove stream at the transition zone, which causes a lateral constriction of the rib stream on its course through the second passage. The pressure of the groove stream is greater than it otherwise would be due to the presence of the vertical constriction caused by the second passage.

When a steady state of flow exists, an equilibrium is established between the force exerted on the streams by the excess of pressure acting in the area of the perimeter of the inlet chamber 15 over that at the perimeter of the discharge end of the bearing and that resulting from the viscosity of the fluid. This opposing force is determined by the configuration of the bearing space and is proportional to the rate of flow of the stream and the resistance of their channels.

With the shaft concentric with respect to the embodiment presented, each flow unit is designed to have the flow resistance of its first passage portion $\frac{1}{12}$ that of its second passage portion. The length of the first passage relative to that of the second passage is such that the pressure at the end of a groove or the grooved area is 40% of the inlet pressure.

Each flow unit may then be considered to exert a force between the surfaces S1 and S2 which is equal to the average pressure of the fluid therein times its surface area. The force being the same for all flow units, the net force exerted is zero.

With the application of an external force, a displacement will take place and for explanation herein, the displacement will be considered to be parallel. Referring to FIG. 6, a condition of displacement is shown.

The character $h'$ indicates the point of greatest reduction in clearance and the character $h''$ the point of greatest increase in clearance resulting from the displacement. It is known that the resistance to flow of the channels varies inversely with the cube of its clearance. A reduction of clearance to $\frac{1}{2}$ will increase the resistance by a factor of 8. A reduction to $\frac{1}{10}$ of the initial clearance will increase flow resistance by a factor of 1000 and this applies to the second passage portion of the flow unit.

Because of its greater clearance relative to the displacement, the resistance of the groove channel is only slightly altered.

As a consequence of the displacement therefore the gradient of the second passage portion at the point of $h'$ will increase. Further, less fluid will be required to flow down the groove channel. Thus the pressure at the ends of the grooves will increase and the pressure at points all along the first passage will increase accordingly and a new equilibrium of pressures is established. The converse is true with respect to the point of increased clearance $h''$.

It will be understood that the pressure along the first passage will differ at corresponding laterally separated points of other flow units between the clearance $h'$ and $h''$. These lateral differences will be termed lateral pressure gradients. These are not to be confused with the local lateral gradients of the flux plot in FIG. 7.

A greater lateral gradient obtained for a given deflection is translated into a greater force for that deflection and consequently a higher bearing stiffness and a greater ultimate load capacity. These lateral gradients are an essential element of the load bearing property of a bearing structure.

The lateral gradients in the structure here presented are obtained by the interaction of the rib and groove streams with the combined streams of the second passage portion in response to displacement.

The grooves of the first passage portion serve the combined function of carrying a calibrated flow of fluid downstream into the transition zone and thence into the second passage portion where deflection or displacement is converted into corresponding pressure fluctuations which in turn produce lateral gradients along the lengths of the passages. The grooves also provide a source of fluid supply for the maintenance of the lateral gradients.

The ribs serve to maintain the resistance of the bearing space to the lateral component of fluid flow which must exist in the presence of a lateral gradient and thereby may be said to tend to confine the groove streams within their respective channels with the result that a higher pressure is obtained at the region $h'$ and a lower pressure is obtained at the region $h''$ for a given displacement.

The grooved first passage portion provides greater resistance to lateral flow than to longitudinal flow; that is, the grooved portion of the bearing space S3 is anisotropic with respect to flow resistance.

The load capacity of the bearing depends upon the rate of flow of fluid of the groove channels that actually reaches the ends of the grooves. This will be the quantity which began in the groove channel less the amount lost to lateral flow along the entire course of the channel. It will be seen that the greater the relative resistance to lateral flow, the greater will be the load capacity for a given displacement. Further the relative resistance to lateral flow permits the use of greater length to diameter ratios than are otherwise possible thereby further increasing the load capacity for a bearing of a given diameter.

With reference to bearing structures comprising external capillary or orifice restrictions, a portion of the pressure drop is dissipated in the orifice whereas the structure of the invention herein provides a grooved portion whereby the entire pressure drop of the fluid is converted into lateral gradients which are brought to bear on the shaft contributing to the load capacity of the bearing and to the more efficient use of the fluid energy.

The structure of the present embodiment has been designed to provide a pressure at the end of the grooves of 40% of the inlet pressure to obtain the optimum restoring force for a deflection or displacement equal to one-half the bearing clearance $h'$.

The description above with reference to flow capacity is given for groove channels where the width is greater than five times the clearance for flow between parallel plates, with there being present negligible error due to effects of the walls of the groove. As grooves are formed narrower, however, the restraining effects of the side walls of the grooves on the flow within the groove channel becomes significant with respect to the restraining effect due to top and bottom surfaces of the groove channel and appropriate formulae will be applied to determine groove dimensions and configurations such as grooves which may be of triangular or other shape in cross section.

Referring to FIG. 8, a graph is shown of the family of curves which are obtained representing the pressure difference that would develop at the ends of the grooves of the flow units for various values of $\lambda$ and $\kappa_1$, with the loss of pressure difference due to lateral flow being disregarded. However because of said loss of pressure difference due to lateral flow, the net pressure differences actually developed will be less than those indicated by the various curves. The actual pressure difference, however, will be in proportion to the pressure differences indicated by the graph. Since the load capacity of the bearing is proportional to said pressure differences, the quantity $$\frac{P_2' - P_2''}{P_1 - P_3}$$

is called the relative load capacity.

The graph shows the effect of the parameter $\kappa_1$ on the relative load capacity of the bearing structure. As indicated on the curve for $\kappa_1 = 2$, the maximum pressure difference is 29% of the total pressure drop. The curve for $\kappa_1 = 20$ indicates a maximum pressure difference of 58%. Hence the maximum relative load capacity for $\kappa_1 = 20$ is twice that for $\kappa_1 = 2$. It will be noted that the value of $\lambda$ for the maximum relative load capacity increases with an increasing $\kappa_1$.

Thus there is shown optimum values of $\lambda$ in relation to the parameter $\kappa_2 = 10$, $\epsilon = .5$ and for the various given values of the parameter $\kappa_1$. ($\epsilon$=eccentricity).

With reference to FIG. 6, a hypothetical flow channel is shown for the purpose of relating longitudinal and lateral flow resistance.

*Further mathematical relationships*

In addition to Equations 1–10 above presented in connection with the proportioning of the specific embodiment presented, the following equations are given for the more general application of the invention:

For liquid only:

(Equation 11) $\quad \dfrac{P_2' - P_3}{P_1 - P_3} = \dfrac{K_1'}{K_1' + \lambda}$ where $P_2'$ is the pressure where a displacement has decreased the clearance as from $h$ to $h'$ and $K_1'$ is the altered ratio of the flow capacity ratio $K_1$ for decreased clearance.

(Equation 11a) $\quad \dfrac{P_2'' - P_3}{P_1 - P_3} = \dfrac{K_1''}{K_1'' + \lambda}$ where $P_2''$ is the pressure at the end of a groove where displacement has increased the clearance as from $h$ to $h''$ and $K_1''$ is the altered ratio of the flow capacity of ratio $K_1$ for increased clearance.

For liquid or gas:

(Equation 12)

$$K_1' = \left[\frac{1 - \dfrac{\epsilon}{\tau}}{1 - \epsilon}\right]^3 \times \frac{C_g}{C_s} + \frac{C_r}{C_s}$$

where $\epsilon$(eccentricity) is the ratio of the clearance $h$ to the displacement, that is, $$\epsilon = \frac{h}{\text{displacement}}$$

When $b_g > 5h_g$, Equation 12 may be written in the more convenient following form:

(Equation 12a)

$$K_1' = \left[\frac{1 - \dfrac{\epsilon}{\tau}}{1 - \epsilon}\right]^3 \times \frac{K_3}{K_2 + 1} + \frac{K_2}{K_2 + 1}$$

(Equation 13)

$$K_1'' = \left[\frac{1 + \dfrac{\epsilon}{\tau}}{1 + \epsilon}\right]^3 \times \frac{C_g}{C_s} + \frac{C_r}{C_s}$$

(Equation 13a)

$$K_1'' = \left[\frac{1 + \dfrac{\epsilon}{\tau}}{1 + \epsilon}\right]^3 \times \frac{K_3}{K_2 + 1} + \frac{K_2}{K_2 + 1}; (b_g \geq 5h_g)$$

(Equation 14)

$$\frac{P_2-P_3}{P_1-P_3}(\text{OPTIMUM}) = \frac{K_1}{K_1+[K_1'K_1'']^{1/2}} \quad \text{(liquid or gas)}$$

where the ratio $$\frac{P_2-P_3}{P_1-P_3}(\text{OPTIMUM})$$

represents the pressure ratio with the bearing surfaces undisplaced which will result in the best bearing stiffness and load capacity for a given displacement ratio or eccentricity. Ordinarily the eccentricity, $\epsilon=.5$ is usd to determine said optimum ratio and will give the best overall bearing characteristics; however in cases such as high precision testing spindles the ratio may be determined for $\epsilon=.1$ in order to provide for somewhat greater bearing stiffness with the shaft near center. Optimization at values of $\epsilon$ greater than .5 will result in substantial loss of bearing stiffness for small displacements and is not recommended.

The ratio $$\frac{P_2-P_3}{P_1-P_3}(\text{OPTIMUM})$$

is used to find $\lambda$ either in the case of liquid or gas as the bearing fluid. Its value depends upon the parameters selected for the particular design; and, when $\epsilon=.5$, the above ratio will be in the range from .39 to .42.

In the case where $$\frac{P_2-P_3}{P_1-P_3}(\text{OPTIMUM})$$

is found for $\epsilon=.1$, the corresponding values will range between .49 and .51. Thus for optimum load bearing characteristics the pressure drop along the length of the grooves with the bearing centered will lie within the range of 49% to 61% of the total pressure drop across the bearing.

(Equation 15) $\quad \dfrac{R_y}{R_x} = \dfrac{K_2K_3+1}{K_2K_3+K_3} \times K_1$ Where $R_x$ and $R_y$ represent the flow resistance of streams of equal width in the longitudinal and lateral directions respectively.

(Equation 15a)

$$\left(\frac{R_y}{R_x}\right)' = \frac{K_2K_3+1}{K_2K_3+K_3} \times K_1'$$

These Equations 15 and 15a express quantitatively the relative resistance of lateral to longitudinal flow inherent in the grooved structure of the invention which constitutes one of the major improvements of the invention.

In the above description, $\kappa_1=12$, $\kappa_2=10$, $\kappa_3=122$. Substituting these values in Equation 15 it will be found that $$\frac{R_y}{R_x} = \frac{1221}{1342} \times 12 = .91 \times 12 = 10.91$$

Referring to FIG. 6 where the shaft is shown, an eccentricity, $\epsilon=.5$ is assumed. The clearance $h$ will be unchanged at the two flow units on the ends of the diameter at right angles to the displacement. In this region the resistance to lateral flow will be 10.91 times the resistance to longitudinal flow.

In the region $h'$ of FIG. 6, however, the value $\kappa_1'$ for the eccentricity of $\epsilon=.5$ as found by the use of Equation 12 is 65.5. This value substituted in Equation 15a gives the result:

$$\left(\frac{R_y}{R_x}\right)' = .91 \times 65.5 = 59.5$$

which shows that the fluid of the groove channel in the region of highest pressure is confined within said channel by a factor of nearly 60, while the fluid within the entire ½ of the bearing constituting the region of high pressure is confined therein by a relative lateral flow resistance which lies between 59.5 and 10.9. This relative confinement effects a marked increase of the equilibrium pressures within said high pressure region and also a decrease of the equilibrium pressures of the opposite low pressure region with a resulting increase of load capacity.

(Equation 16) $\quad \lambda = \kappa_1 \dfrac{(P_1^2 P_2^2)}{(P_2^2 P_3^2)} \quad \text{(for gas)}$ Where $P_1$, $P_2$, and $P_3$ are in terms of absolute pressures and the flow is isothermal.

The expansion of a gas as it flows through the bearing space is taken into account by the coefficient, $$\frac{(P_1^2-P_2^2)}{(P_2^2-P_3^3)}$$

The value of $\lambda$ for optimum bearing characteristics is determined by the use of Equation 14 above to find the optimum pressure drop ratio $$P_2-P_3/P_1-P_3$$

then with the operating pressures $P_1$ and $P_3$ known, the squares of the appropriate absolute pressures are substituted in Equation 16 to find $\lambda$ in relation to $K_1$. Experience has shown that the temperature drop in the thin bearing space is small in relation to the absolute temperature so that the flow usually may be considered to be isothermal for purposes of design.

Thus it is seen that I have provided a simply and efficiently constructed grooved bearing structure having wide application as to various forms and configurations and this structure has operated very successfully in actual practice.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An externally pressurized hydrostatic bearing assembly, comprising
    a bearing surface having a fluid supply chamber through which fluid under pressure is supplied to the bearing surface,
    a second bearing surface opposing and facing said bearing surface and forming therewith a hydrostatic bearing assembly,
    the length of said hydrostatic bearing assembly being greater than 500 times the clearance between said opposed bearing surfaces,
    one of said bearing surfaces having a plurality of elongated grooves forming a first fluid passage for receiving said pressurized fluid from said fluid supply chamber and carrying it outwardly therefrom to the outer end of the bearing assembly,
    said elongated grooves extending outward from said fluid supply chamber to a point short of the outer end of said bearing assembly so that a restricted second flow passage between said opposed bearing surfaces is formed at the outer periphery of said bearing assembly,
    the length of said restricted second flow passage being greater than 20 times the clearance between said opposed bearing surfaces, and
    said elongated grooves forming ribs therebetween that have a width each less than four times the length of said restricted second flow passage, whereby the pressure drop along the grooves is in the range from one-quarter to three-quarters of the total pressure drop from said fluid supply chamber to the outer end of the bearing assembly.

2. An externally pressurized hydrostatic bearing assembly as set forth in claim 1, wherein
    said elongated grooves each have a width approximately equal to or greater than five times its depth.

3. An externally pressurized hydrostatic bearing assembly as set forth in claim 1, wherein
said first mentioned bearing surface is cylindrical, and
said opposed bearing surface is formed on a cylindrical shaft within said first mentioned bearing surface with said first mentioned bearing surface and said shaft having relative movement therebetween.

4. An externally pressurized hydrostatic bearing assembly as set forth in claim 1, wherein
said pressurized fluid supply chamber is an annular passageway which is connected to a fluid supply line.

5. An externally pressurized hydrostatic bearing assembly as set forth in claim 1, wherein
the length of the first passage relative to that of said second passage is such that the pressure at the outer end of the grooves is 40% of the inlet pressure to said fluid supply chamber.

References Cited by the Examiner

UNITED STATES PATENTS 2,673,767   3/1954   Schoejzsner _____ 308—122

OTHER REFERENCES

Oil Mist Lubrication for Air Bearings, by C. R. Adams, Product Engineering, August 29, 1960, pages 54 and 55 relied upon.

MARTIN P. SCHWADRON, *Primary Examiner.*

F. SUSKO, *Assistant Examiner.*

UNITED STATES PATENT OFFICE
CERTIFICATE OF CORRECTION

Patent No. 3,305,282                            February 21, 1967

Harold E. G. Arneson

It is hereby certified that error appears in the above numbered patent requiring correction and that the said Letters Patent should read as corrected below.

Column 2, line 65, for "d" read -- D --; column 4, line 9, for "with" read -- width --; lines 33 and 34, Equation 3 should appear as shown below instead of as in the patent:

$$K_2 = \frac{b_r}{b_g}$$

lines 36 and 37, Equation 4 should appear as shown below instead of as in the patent:

$$\lambda = \frac{\ell_{1,2} - \Delta\ell}{\ell_{2,3} + \Delta\ell}$$

same column 4, line 75, for ".005" read -- .0005 --; column 5, Equation 9, for that portion reading $$\frac{\partial P}{\partial s} \quad \text{read} \quad \frac{dP}{ds}, \text{ where}$$

line 64, for "∂P/∂s" read -- dP/ds --; same column 5, Equation 10, should appear as shown below instead of as in the patent:

$$C = \frac{Q}{\frac{\partial P}{\partial x} \times \mu}$$

column 6, line 26, for "to" read -- the --; line 42, for "groover" read -- groove --; line 47, strike out "of", first occurrence; column 8, line 56, for "its" read -- their --; column 12, Equation 16, for that portion reading (2)
3,305,282

$$\frac{(P_1{}^2P_2{}^2)}{(P_2{}^2P_3{}^2)} \quad \text{read} \quad \frac{(P_1{}^2-P_2{}^2)}{(P_2{}^2-P_3{}^2)}$$

Signed and sealed this 21st day of November 1967.

(SEAL)
Attest:

EDWARD M. FLETCHER, JR.
Attesting Officer

EDWARD J. BRENNER
Commissioner of Patents